United States Patent
Chen et al.

(10) Patent No.: US 9,620,963 B2
(45) Date of Patent: Apr. 11, 2017

(54) PORTABLE ELECTRIC APPARATUS WITH POWER ADAPTER TO MAINTAIN POWER EFFICIENCY BASED ON STATE INFORMATION OF HOST

(71) Applicants: Yao-Hwa Chen, Taipei (TW); Yi-Wen Chiu, Taipei (TW); Sheng-Wei Hsiao, Taipei (TW)

(72) Inventors: Yao-Hwa Chen, Taipei (TW); Yi-Wen Chiu, Taipei (TW); Sheng-Wei Hsiao, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 236 days.

(21) Appl. No.: 14/264,069

(22) Filed: Apr. 29, 2014

(65) Prior Publication Data

US 2014/0331067 A1 Nov. 6, 2014

(30) Foreign Application Priority Data

May 2, 2013 (CN) .......................... 2013 1 0158743

(51) Int. Cl.
*G06F 1/26* (2006.01)
*H02J 5/00* (2016.01)
(52) U.S. Cl.
CPC ................ *H02J 5/00* (2013.01); *G06F 1/266* (2013.01)
(58) Field of Classification Search
None
See application file for complete search history.

(56) References Cited

U.S. PATENT DOCUMENTS

| | | | | |
|---|---|---|---|---|
| 2002/0023235 A1* | 2/2002 | Odaohhara | ............. | G06F 1/263 713/320 |
| 2006/0103996 A1* | 5/2006 | Carroll | .................. | G06F 1/3203 361/90 |
| 2006/0192530 A1* | 8/2006 | Nguyen | .................. | G06F 1/263 320/128 |
| 2006/0277420 A1* | 12/2006 | Nguyen | .................. | G06F 1/263 713/300 |

(Continued)

FOREIGN PATENT DOCUMENTS

CN 101299164 11/2008
CN 101355256 1/2009

(Continued)

*Primary Examiner* — Thomas Lee
*Assistant Examiner* — Danny Chan
(74) *Attorney, Agent, or Firm* — Jianq Chyun IP Office

(57) ABSTRACT

A portable electronic device is provided. The portable electronic device includes a host, a power adapter and a signal transmission interface. The host generates state information according to present operating state, and the power adapter is used to provide a voltage to the host. The power adapter receives the state information of the host via the signal transmission interface, and adjusts the output voltage according to the state information. By transmitting information between the host and the power adapter, the power adapter can be adjusted according to the operating state of the host. Moreover, the host can adjust the operating state according to the specification information of the power adapter. Consequently, the power consuming of the portable electronic device has best efficiency thus to reduce carbon emission.

10 Claims, 2 Drawing Sheets

(56) References Cited

U.S. PATENT DOCUMENTS

| | | | | |
|---|---|---|---|---|
| 2007/0105415 A1* | 5/2007 | Jin | ............... | H01R 13/6675 |
| | | | | 439/122 |
| 2007/0153357 A1* | 7/2007 | Noh | ............... | G02F 1/155 |
| | | | | 359/267 |
| 2007/0250722 A1* | 10/2007 | Montero | ............... | G06F 1/263 |
| | | | | 713/300 |
| 2007/0300089 A1* | 12/2007 | Bhogal | ............... | G06F 1/263 |
| | | | | 713/320 |
| 2009/0177906 A1* | 7/2009 | Paniagua, Jr. | ............... | G06F 1/26 |
| | | | | 713/340 |
| 2009/0244944 A1* | 10/2009 | Jang | ............... | H02J 7/345 |
| | | | | 363/126 |
| 2010/0165667 A1* | 7/2010 | Artusi | ............... | H02M 1/4225 |
| | | | | 363/21.01 |
| 2012/0049644 A1* | 3/2012 | Choi | ............... | H02J 5/005 |
| | | | | 307/104 |
| 2012/0069606 A1* | 3/2012 | Sagneri | ............... | H02M 3/158 |
| | | | | 363/21.02 |
| 2012/0170323 A1* | 7/2012 | Iida | ............... | H01F 27/2804 |
| | | | | 363/16 |
| 2013/0038306 A1* | 2/2013 | Kelly | ............... | H02M 3/156 |
| | | | | 323/283 |
| 2013/0049487 A1* | 2/2013 | Lanni | ............... | H02M 1/10 |
| | | | | 307/151 |
| 2013/0070796 A1* | 3/2013 | Belloni | ............... | H05B 33/0815 |
| | | | | 372/38.01 |

FOREIGN PATENT DOCUMENTS

| | | |
|---|---|---|
| CN | 101681189 | 3/2010 |
| TW | I379488 | 12/2012 |

* cited by examiner

PORTABLE ELECTRIC APPARATUS WITH POWER ADAPTER TO MAINTAIN POWER EFFICIENCY BASED ON STATE INFORMATION OF HOST

CROSS-REFERENCE TO RELATED APPLICATION

This application claims the priority benefit of China application serial NO. 201310158743.7, filed on May 2, 2013. The entirety of the above-mentioned patent application is hereby incorporated by reference herein and made a part of the specification.

BACKGROUND OF THE INVENTION

Field of the Invention

This invention relates to an electronic device and, more particularly to a portable electronic device with a power adapter.

Description of the Related Art

With the advancement of electronic technology, consumer electronic products become necessary tools in people's life. To provide power to the electronic product, each electronic product is configured with a power adapter. The power adapter converts received power such as alternating current (AC) power or direct current (DC) power, and generates an output voltage accordingly to directly provide to the electronic product. The power adapter directly provides power for the electronic product, and it also charges a battery in the electronic product.

However, whether there is a battery inside electronic products, or what the operation state is, the power adapter keeps providing the output voltage to the electronic product, which results power waste. For example, when the electronic product receives power via the power adapter for operating, the power adapter keeps converting the power supply and consumes power even when the electronic products operates at a hibernation mode. Moreover, when the power adapter provides the output voltage to charge the battery of the electronic products, the power adapter continues providing the output voltage to the battery even when the charge is completed, and the power is wasted.

BRIEF SUMMARY OF THE INVENTION

A portable electronic device and a power adapter that adjusts an output voltage according to an operating state of a host of the portable electronic device are provided herein.

The portable electronic device includes a host, a power adapter and a signal transmission interface. The host generates state information according to an operating state, the power adapter is coupled to the host to provide the output voltage to the host, and the signal transmission interface is coupled between the host and the power adapter. The power adapter receives the state information via the signal transmission interface and adjusts the output voltage according to the state information.

Consequently, the host of the portable electronic device communicates with the power adapter via the signal transmission interface. And, the power adapter adjusts the output voltage and/or the efficiency of generating the output voltage via the state information received by the signal transmission interface. The host adjusts the operating state according to specification information of the power adapter received by the signal transmission interface. The host and the power adapter adjusts the operating state dynamically according to mutual state to save power.

DETAILED DESCRIPTION OF THE EMBODIMENTS

Figure 1:
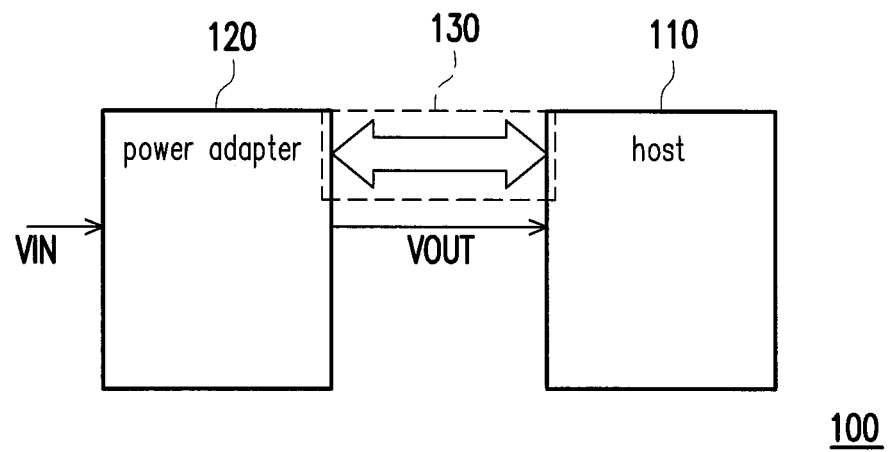
FIG. 1 is a schematic diagram showing a portable electronic device in a first embodiment.

FIG. 1 is a schematic diagram showing a portable electronic device 100 in a first embodiment. The portable electronic device 100 includes a host 110, a power adapter 120 and a signal transmission interface 130. The power adapter 120 is coupled to the host 110, and the power adapter 120 generates the output voltage VOUT. The output voltage VOUT is provided to the host 110 to be used as an operating power supply of the host 110. The signal transmission interface 130 is coupled between the host 110 and the power adapter 120 for transmitting data between the host 110 and the power adapter 120.

In this embodiment, the host 110 generates state information according to its operating state. For example, the state signal generated by the host 110 represents that the host 110 is at a shutdown mode, a standby mode, a sleep mode or a booting mode.

The power adapter 120 is informed the operating state of the host 110 via the signal transmission interface 130, such as a shutdown state, a standby state, a sleep state or a booting state, and the power adapter 120 adjusts output efficiency according to the operating state of the host 110. It is well known that the power consumed by the host 110 at the standby state is smaller than that consumed by the host at the normal operating mode. Therefore, in an embodiment, when the power adapter 120 is informed that the host 110 is at the booting state, the power adapter 120 outputs larger power to the host 110 as the operating power supply. Correspondingly, when the power adapter 120 is informed that the operating state of the host 110 is switched to the standby state, the power adapter 120 adjusts to output lower power to the host 110.

Moreover, the power adapter 120 can adjust the value of the output voltage VOUT according to the operating state of the host 110. The operating state of the host 110 also may include the information that whether the host 110 is installed with a battery and the power of the battery. When the host 110 enters into the shutdown state, the power adapter 120 can be off automatically and make the output voltage VOUT reduced to zero.

Please refer to Table 1:

| operating state | output voltage | with battery or not |
|---|---|---|
| Sb1 | DCb1 | yes |
| Sb2 | DCb2 | yes |
| Sb3 | DCb3 | yes |
| . | . | |
| . | . | |

-continued

| operating state | output voltage | with battery or not |
|---|---|---|
| . | . | |
| Sbm | DCbm | yes |
| Sa0 | DC0 | no |
| Sa1 | DC1 | no |
| Sa2 | DC2 | no |
| . | . | |
| . | . | |
| . | . | |
| San | DCn | no |

The host 110 distinguishes the operating states Sb1 to Sbm and Sa0 to San according to operating modes of the host 110, whether the host 110 is installed with a battery, or the power status of the battery. The host 110 generates the state information according to one of the operating states Sb1 to Sbm and Sa0 to San. The power adapter 120 adjusts the output voltage VOUT to be one of DCb1 to DCbm or one of DC1 to DCn according to the state information. Additionally, no matter how much the value of the output voltage VOUT generated by the power adapter 120 is, the output efficiency is maintained above a preset ratio.

When the host 110 is at the shutdown state and no battery is installed (such as the operating state San), the power adapter 120 generates the output voltage VOUT whose value is DCn, and DCn may be 0 volt. When the host 110 enters into the standby state, the hibernation state or the sleep state (such as the operating state Sa1 to San-1) and no battery is installed, the power adapter 120 generates the output voltage VOUT whose value equals to one of voltage values DC1 to DCn-1 accordingly. Analogously, when the host 110 enters into the booting state (such as the operating state Sa0) and no battery is installed, the power adapter 120 correspondingly generates the output voltage VOUT whose value equals to the voltage value DC0.

Furthermore, when the host 110 is at the shutdown state and a battery is installed (such as the operating state Sbm), the power adapter 120 correspondingly generates the output voltage VOUT whose value is the voltage value DCbm, the voltage value DCbm may not be 0 volt, and the power adapter 120 provides the output voltage VOUT to charge the battery. Additionally, when the battery is fully charged, the host 110 regards the operating state as that the host 110 is at the shutdown state and no battery is installed (such as the operating state San). The power adapter 120 adjusts the output voltage VOUT to be 0 volt according to the operating state San.

When the host 110 is at the standby mode, the hibernation state or the sleep state and the battery is installed in the host 110 (such as one of the operating states Sb2 to Sbm-1), the output voltage VOUT provided by the power adapter 120 not only provides power to the host 110 at the standby mode, the hibernation mode or the sleep mode but also provides power to charge the battery. At this moment, the host 110 can transmit the charging state of the battery to the power adapter 120 by communicating with the power adapter 120. After the charge of the battery is completed, the host 110 regards the present operating state as that the host 110 is at the standby mode, the hibernation mode or the sleep mode and no battery is installed (such as one of the operating states Sa1 to San-1), the power adapter 120 correspondingly generates the output voltage VOUT whose value is one of the values DC1 to DCn-1.

When the host 110 is at the booting mode and the battery is installed, the host 110 is at the operating state Sb1, the power adapter 120 provides the output voltage VOUT whose value is DCb1 to the host 110 to maintain the operation of the host 110 and meet the power requirement of charging the battery.

In other words, the power adapter 120 can adjust the output voltage VOUT and the output power of the host 110 according to the power requirement of the host. Additionally, the power adapter 120 adjusts the conversion efficiency of the power adapter 120 according to the output power of the output voltage VOUT, and the efficiency of the output voltage VOUT of the power adapter 120 is maintained above a preset ratio. The preset ratio is a preset value according to the rules of Energy Star, and the preset ratio may be 90%.

The power adapter 120 can adjust a power factor of the power adapter to adjust the output power of the power adapter 120. The method of adjusting the power factor is well known by persons having ordinary skill in the art, which is omitted herein.

Furthermore, the power adapter 120 not only adjusts the power factor according to the operating state of the host 110, but also transmits the adjusted power factor to the host 110 via the signal transmission interface 130. The host 110 can make the power factor from the power adapter 120 displayed at a display device.

The power adapter 120 can adjust the value of the output voltage VOUT dynamically and adaptively according to the operating state of the host 110, and the output efficiency is maintained above a certain ratio to achieve requirements of energy saving and low carbon.

Furthermore, the power adapter 120 can transmit the specification information of the power adapter 120 to the host 110 via the signal transmission interface 130. The specification information includes rated voltage, rated current, rated power, and the input efficiency of the output voltage VOUT of the power adapter 120. After the host 110 receives the specification information of the power adapter 120, the specification information is displayed on the display for reference, the host 110 also can compare the specification information of the power adapter 120 (such as rated power) with the required power of the host 110 and execute corresponding operation.

For example, the rated power provided by the power adapter 120 is rated power X, the power needed by the host 110 is required power Y according to the operating state. When the rated power X is larger than the required power, the host 110 can operate normally, but the host 110 provides an alerting signal to inform the user that the rated power of the power adapter 120 is too large. The host 110 can inform the user via a sound of a buzzer, light of a luminous element and/or a display screen to inform the user that the specification of the power adapter 120 does not comply with that of the host 110.

When the rated power X equals to the required power Y, the specification of the power adapter 120 complies with that of the host 110, the host 110 operates normally.

When the rated power X is smaller than the required power Y, the host 110 provides the alerting signal to inform the user that the power provided by the power adapter 120 is not sufficient for the host 110 to operate normally. The host 110 informs the user that the power adapter 120 needs be replaced by an appropriate power adapter via the sound of the buzzer, the light of the luminous element or the display screen. Moreover, to avoid the overload of the power adapter 120, the host 110 adjusts the operating state to reduce the required power Y to make the required power Y as close as possible to (no more than) the rated power X.

For example, if the host 110 is at the booting state, when the rated power X is smaller than the required power Y, the host 110 first sends out an alerting signal to inform the user that the power adapter 120 does not comply with demands. After an interval after sending out the alerting signal, the host 110 is switched from the booting state to the shutdown state, the standby state, the hibernation state or the sleep state, and/or the charge of the battery is stopped to reduce the required power Y.

Furthermore, the power adapter 120 also may transmit the operating temperature of the power adapter 120 to the host 110 via the signal transmission interface 130. The host 110 determines whether the operating temperature is larger than a default threshold temperature. When the host 110 determines that the operating temperature of the power adapter 120 is larger than the default threshold temperature, the host 110 accordingly generates an alerting signal to inform the user that the operating temperature of the power adapter 120 is too high. Consequently, the portable electronic device 100 in this embodiment saves energy and reduces carbon emission, and the safety of the user is guaranteed.

Additionally, when the output power of the power adapter 120 is larger than the rated power, the signal transmission interface 130 transmits an overload signal to the host 110 to inform the host 11 to adjust the operating state to reduce the power requirement of the host 110 according to the received overload signal. Consequently, it avoids that the power adapter 120 overloads to ensure the safety of the product. The host 110 can adjusts the operating state to the shutdown state, the standby state, the hibernation state or the sleep state, or/and the charge of the battery is stopped to reduce the required power.

Figure 2A:
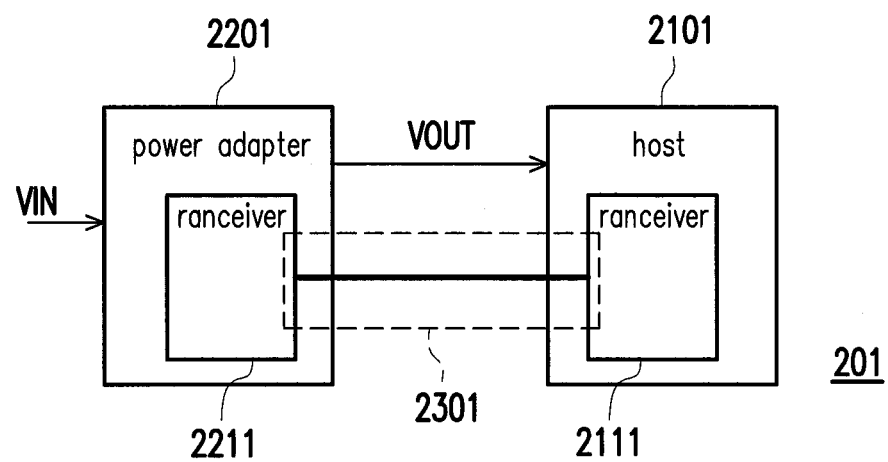
FIG. 2A is a schematic diagram showing a portable electronic device in a second embodiment.

FIG. 2A is a schematic diagram showing the portable electronic device 201 in a second embodiment. The portable electronic device 201 includes a host 2101, a power adapter 2201 and a signal transmission interface 2301. The host 2101 and the power adapter 2201 include transceivers 2111 and 2211 respectively, and the signal transmission interface 2301 is coupled between the transceivers 2111 and 2211.

In this embodiment, the signal transmission interface 2301 is a wired signal transmission interface, the signal transmission interface 2301 for example is a serial peripheral interface (SPI), an inter-integrated circuit (I2C), a system management bus (SMBUS), a power management bus (PMBUS), an one wire protocol and/or any serial interface.

Figure 2B:
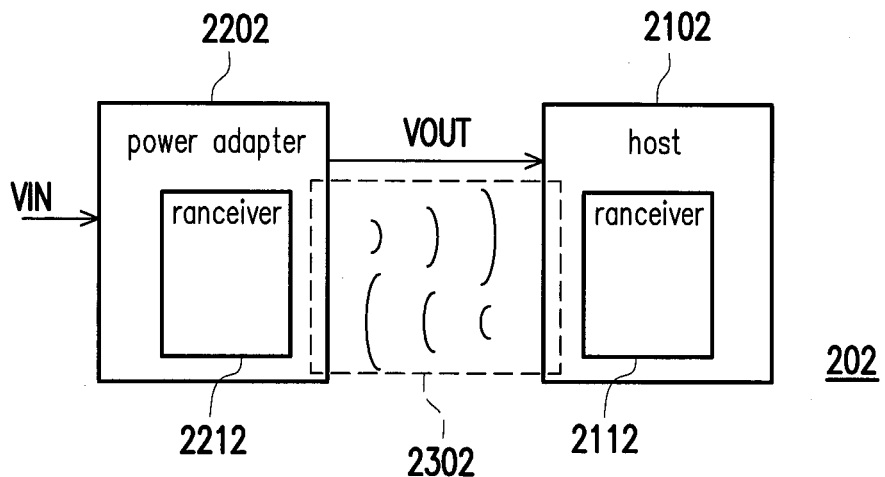
FIG. 2B is a schematic diagram showing a portable electronic device in a third embodiment.

FIG. 2B is a schematic diagram showing the portable electronic device 202 in a third embodiment. The portable electronic device 201 includes a host 2102, a power adapter 2202 and a signal transmission interface 2302. The host 2102 and the power adapter 2202 respectively include transceivers 2112 and 2212, the signal transmission interface 2302 is coupled between the transceivers 2112 and 2212. In this embodiment, the signal transmission interface 2302 includes wireless transmission interfaces such as Bluetooth or/and a wireless transmission interface of a radio frequency transmission interface.

Figure 2C:
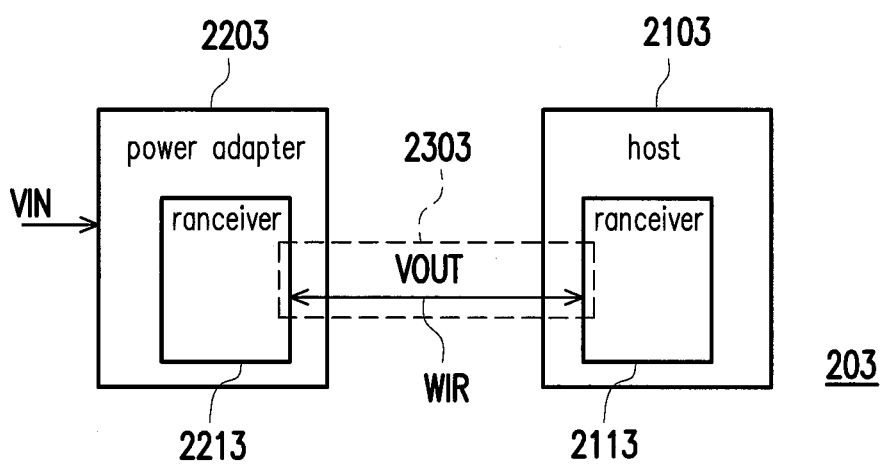
FIG. 2C is a schematic diagram showing a portable electronic device in a fourth embodiment.

FIG. 2C is a schematic diagram showing a portable electronic device 203 in a fourth embodiment. The portable electronic device 203 includes a host 2103, a power adapter 2203 and a signal transmission interface 2303. The host 2103 and the power adapter 2203 respectively include transceivers 2113 and 2213, and the signal transmission interface 2303 is coupled between the transceivers 2113 and 2213. In this embodiment, the signal transmission interface 2303 includes a power transmission line WIR. The power transmission line WIR is coupled between the transceivers 2113 and 2213, and the power transmission line WIR can be used to transmit the output voltage VOUT to the host 2103. Moreover, the host 2103 and/or the power adapter 2203 can transmit information to each other by providing carrier information at the output voltage VOUT.

The signal transmission interfaces in FIG. 2A to FIG. 2C are not used to limit the invention. The form and the transmission method of the signal transmission interface between the host and the power adapter can be one or a combination of analog, digital, wired, wireless, serial or parallel, which is not limited.

Consequently, by transmitting information between the host and the power adapter, the power adapter adjusts according to the operating state of the host, and the host can adjust the operating state according to the specification information of the power adapter. Thus, the portable electronic device has best efficiency of using the energy to save energy and reduce carbon emission.

Although the disclosure has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. A portable electronic device, comprising:
a host generating state information according to an operating state;
a power adapter coupled to the host, wherein the power adapter generates an output voltage to provide to the host; and
a signal transmission interface coupled between the host and the power adapter;
wherein the power adapter receives the state information via the signal transmission interface and adjusts one or both of the output voltage and efficiency for maintaining the efficiency of the output voltage of the power adapter to be larger than a default ratio to generate the output voltage according to the state information,
wherein the power adapter transmits specification information to the host via the signal transmission interface, the specification information includes rated power, rated voltage, rated current and efficiency of outputting the output voltage; and when the host determines that the rated power is larger than rated required power of the host, the host generates an alerting signal; when the host determines that the rated power is smaller than the rated required power of the host, the host adjusts the operating state to reduce the required power and generates an alerting signal; and when output power of the power adapter is larger than rated power of the power adapter, the power adapter transmits an overload signal to the host via the signal transmission interface, the host adjusts the operating state to reduce the required power.

2. The portable electronic device according to claim 1, wherein the power adapter adjusts the value of the output voltage or stops generating the output voltage according to the state information.

3. The portable electronic device according to claim 1, wherein the power adapter adjusts a power factor according to the state information.

4. The portable electronic device according to claim 3, wherein the power adapter transmits the power factor of the power adapter to the host via the signal transmission interface.

5. The portable electronic device according to claim 1, wherein the host displays the specification information on a display screen.

6. The portable electronic device according to claim 1, wherein the power adapter transmits the operating temperature to the host via the signal transmission interface.

7. The portable electronic device according to claim 6, wherein when the host determines that the operating temperature is larger than a default threshold temperature, the alerting signal is generated.

8. The portable electronic device according to claim 1, wherein the power adapter generates an alerting signal according to the overload signal.

9. The portable electronic device according to claim 1, wherein the signal transmission interface includes one or a combination of a serial interface, a parallel interface and a wireless transmission interface.

10. The portable electronic device according to claim 1, wherein the signal transmission interface includes:
   a power transmission line coupled to the host and the power adapter to transmit the output voltage to the host, and the host and the power adapter transmit information mutually by providing carrier info nation at the output voltage.

* * * * *